Patented Sept. 5, 1922.

1,428,256

UNITED STATES PATENT OFFICE.

LUIS ANGEL ROMERO, OF SAN FRANCISCO, CALIFORNIA.

PROCESS OF MAKING COFFEE EXTRACT.

No Drawing. Application filed January 14, 1920, Serial No. 351,436. Renewed June 14, 1922. Serial No. 568,236.

*To all whom it may concern:*

Be it known that I, LUIS ANGEL ROMERO, a citizen of Colombia, South America, residing at the city and county of San Francisco and State of California, have invented new and useful Improvement in Processes of Making Coffee Extract, of which the following is a specification.

This invention relates to the process of manufacturing coffee extract and the product obtained thereby.

One of the objects of the present invention is to produce a highly concentrated extract of coffee having a paste-like consistency.

Another object of the invention is to produce an extract of the character described which is readily soluble in milk or hot water and which is so concentrated that a teaspoonful of the same when dissolved in water will produce at least a cup of coffee.

Another object of the invention is to provide an absorbent for reducing the extract to a paste-like consistency; furthermore an absorbent which is capable of holding and absorbing the main constituents of the coffee, and also capable of retaining the flavor and aroma contained therein.

The coffee extract or paste is produced in the following manner:

One-half pound of pulverized or ground roasted coffee is mixed with sixteen liquid ounces of water and boiled in the usual manner. The solution or coffee thus obtained is then filtered and strained and to every four liquid ounces of the solution is then added three ounces of pulverized milk sugar. This mixture of coffee and sugar is then boiled until practically 75% of the water contained has been evaporated, care being taken that the mixture is carefully stirred or agitated during the evaporating process. A paste-like extract is in this manner produced.

I find in actual practice that a considerable portion of the flavor and aroma of the coffee is lost during the evaporating stage and that this may be practically replaced by adding a small quantity of the coffee extract produced by the first step of the process. I therefore add a small quantity of this coffee after the sugar and coffee has been reduced to a heavy paste and then permit the mixture to boil until the thickness of the paste reaches a sirup-like consistency. The extract is then ready and may be filled in glasses, cans, or other suitable receptacles, for sale or other purposes.

The sugar contents of this paste is so great that fermentation or moulding of the paste will not take place. It is therefore not necessary to employ hermetically sealed containers.

The paste or extract obtained by this process is highly concentrated and contains practically all the ingredients, flavor and aroma of the original coffee. A teaspoonful of the paste, when stirred in a cup of hot water, produces a cup of coffee, the strength of which may be varied to suit the individual taste.

The use of milk sugar is an important feature of the present invention. It first of all serves as an absorbent or carrier for the different ingredients contained in the coffee, and it secondly serves as a preservative and a thickening medium. It is well known that milk sugar contains less sweetening flavor than any sugar known. It is therefore not objectionable to people that do not care for sweet coffee.

I find in actual practice that a spoonful of the paste when dissolved in a cup of hot water produces coffee which seems to be unsweetened. It may therefore be drunk as such or ordinary sugar may be added where the taste of the person requires the same. It may therefore be relished by any one.

Having thus described my invention, what I claim and desire to secure by Letters Patent is—

1. The process of manufacturing a coffee extract which consists in boiling pulverized coffee in water, filtering the solution thus obtained, mixing said solution with pulverized milk sugar and boiling the coffee solution and sugar until it assumes a paste-like consistency.

2. The process of manufacturing a coffee extract which consists in boiling pulverized coffee in water, filtering the solution thus obtained, mixing said solution with pulverized milk sugar and boiling the coffee solution and sugar until it assumes a paste-like consistency, then adding a quantity of the solution first obtained and again boiling the mixture until it assumes a paste-like consistency.

In testimony whereof I have hereunto set my hand in the presence of two subscribing witnesses.

LUIS ANGEL ROMERO.

Witnesses:
  W. W. HEALEY,
  JOHN J. CUNNINGHAM, Jr.